(12) United States Patent
Hans et al.

(10) Patent No.: US 10,185,669 B2
(45) Date of Patent: Jan. 22, 2019

(54) SECURE KEY DERIVATION FUNCTIONS (71) Applicant: Oracle International Corporation, Redwood City, CA (US)

(72) Inventors: Sebastian J. Hans, Berlin (DE); Eric M. Vetillard, Valbonne (FR)

(73) Assignee: Oracle International Corporation, Redwood City, CA (US)

( * ) Notice: Subject to any disclaimer, the term of this patent is extended or adjusted under 35 U.S.C. 154(b) by 100 days.

(21) Appl. No.: 14/451,309

(22) Filed: Aug. 4, 2014

(65) Prior Publication Data

US 2016/0036587 A1    Feb. 4, 2016

(51) Int. Cl.
*H04L 9/08* (2006.01)
*G06F 12/14* (2006.01)
(Continued)

(52) U.S. Cl.
CPC .......... *G06F 12/1408* (2013.01); *G06F 21/72* (2013.01); *G06F 21/77* (2013.01);
(Continued)

(58) Field of Classification Search
CPC .. H04L 9/0894; H04L 9/0861; G06F 12/1408
See application file for complete search history.

(56) References Cited

U.S. PATENT DOCUMENTS

| 4,941,176 A | 7/1990 | Matyas et al. |
| 7,395,435 B2 | 7/2008 | Benhammou et al. |

(Continued)

FOREIGN PATENT DOCUMENTS

| EP | 2388948 | 11/2011 |
| WO | 2014026095 | 2/2014 |

OTHER PUBLICATIONS

Martin Paljak, AppletPlayground; CardEdge.java; May 2, 2000; www.programcreek.com; Example 6, source code; retreived from http://www.programcreek.com/java-api-examples/index.php?source_dir=AppletPlayground-master/src/com/musclecard/CardEdge/CardEdge.java on Aug. 10, 2017.*

(Continued)

*Primary Examiner* — Carl G Colin
*Assistant Examiner* — Gary E Lavelle
(74) *Attorney, Agent, or Firm* — Robert C. Kowert; Meyertons, Hood, Kivlin, Kowert & Goetzel, P.C.

(57) ABSTRACT

Secure key derivation within a virtualized execution environment may involve a key derivation module executing within a platform layer of the execution environment. An application executing within an application layer of the execution environment may access the key derivation module in order to generate a cryptographic key according to a key derivation function. Instead of being returned to the application, the derived key may be stored within a secure storage area of the execution environment without being stored, even temporarily in the application layer, or other non-secure areas, of the execution environment. The application may receive a reference to the derived key usable by other cryptographic processes. The application may pass the key reference to a method of a cryptographic module and the cryptographic module may use the key reference to access the derived key from the secure storage for use in performing any of various cryptographic processes.

20 Claims, 8 Drawing Sheets

(51) Int. Cl.
*G06F 21/72* (2013.01)
*G06F 21/77* (2013.01)

(52) U.S. Cl.
CPC .......... *H04L 9/0861* (2013.01); *H04L 9/0869* (2013.01); *H04L 9/0877* (2013.01); *G06F 12/14* (2013.01); *H04L 9/08* (2013.01)

(56) References Cited

U.S. PATENT DOCUMENTS

| | | | |
|---|---|---|---|
| 7,804,958 B2 | 9/2010 | Kahn et al. | |
| 8,619,990 B2 | 12/2013 | Arnold et al. | |
| 2003/0037237 A1* | 2/2003 | Abgrall | G06F 21/53 713/166 |
| 2007/0016801 A1* | 1/2007 | Bade | G06F 21/57 713/193 |
| 2008/0056498 A1 | 3/2008 | Verma | |
| 2010/0027788 A1 | 2/2010 | Tkacik et al. | |
| 2010/0199104 A1* | 8/2010 | Van Rijnswou | G06F 21/53 713/189 |
| 2012/0084806 A1 | 4/2012 | Fahrny et al. | |
| 2014/0010371 A1* | 1/2014 | Khazan | G06F 21/602 380/278 |
| 2014/0098953 A1 | 4/2014 | Dellow | |
| 2015/0095652 A1* | 4/2015 | Song | H04L 9/0825 713/176 |
| 2015/0244711 A1* | 8/2015 | Venkataraman | H04L 63/0823 713/156 |
| 2015/0319151 A1* | 11/2015 | Chastain | H04L 63/068 713/171 |

OTHER PUBLICATIONS

"Tee-Based Trusted Storage", Javier Gonzalez, Philippe Bonnet, IT University of Copenhagen, Feb. 2014, pp. 1-8.
International Search Report and Written Opinion from PCT/US2015/043667, dated Apr. 28, 2016, Oracle International Corporation, pp. 1-13.
Wikipedia, "Key derivation function", Retrieved from URL: https://en.wikipedia.org/wiki/Key_derivation_function, Apr. 14, 2016, pp. 1-3.
Anonymous, "Q&A: How to generate and protect keys in Java Card?—On the Road to Bandol", Retrieved from URL: http://javacard.vetilles.com/2011/03/06/qa-how-to-generate-and-protect-key-in-java-card, Apr. 14, 2016, pp. 1-2.
Sun Microsystems, "Runtime Environment Specification—Java Card Platform", Version 3.0, Classic Edition, Mar. 2008, pp. 1-158.
Stefan Berger, et al., "vTPM: Virtualizing the Trusted Platform Module", In Proceedings 15th Conference of USENIX Symposium, 2006, pp. 305-319.
International Preliminary Examining Authority from PCT/US2015/043667, dated Nov. 25, 2016, Oracle International Corporation, pp. 1-17.
Sun Oracle, "KeyPair (Java Card API and Subsets)", Jan. 2, 2006, Retrieved from URL: https://www.win.tue.nl/pinpasjc/docs/apis/jc111/javacard/security/KeyPair.html on Nov. 11, 2016, pp. 1-5.

* cited by examiner

SECURE KEY DERIVATION FUNCTIONS

BACKGROUND

Card computing devices may provide identification, authentication, data storage and application processing in a variety of systems from mobile phones to automated teller machines and drivers licenses. Java has become a common development platform for creating applications for card computing devices. For instance, Java Card™ is a small Java implementation for embedded devices including card computing devices. Additionally, cyber intrusions and attacks have been increasing, often exposing sensitive information.

Traditionally, cryptographic keys derivation by an application (or applet) on a card computing device generally involves copying various data used as part of key derivation and/or other cryptographic material within memory (e.g., random access memory or RAM) of the card computing device and that is accessible to the application. For example, random data and additional derivation data are generally copied into byte arrays and passed as parameters to a key derivation process. Additionally, these data are copied between byte arrays and internal buffers as part of the key derivation process. Also, the result of the key derivation process is generally passed back to the application, such as in a byte array.

Generally, the normal RAM accessible to applications executing on a card computing device is less secure (e.g., from a cryptographic point of view) than protected non-volatile memory. Traditionally, the sensitive data (e.g., data used as part of the key derivation process) passed through the RAM of the chip may be vulnerable to a cryptographic attack and an attacker can frequently analyze the chip behavior and gain additional information about the derived key and other cryptographic data (e.g., since the data passes through the normal, less secure, RAM of the chip).

SUMMARY

Secure key derivation within a virtualized execution environment, such as on a card computing device, may involve utilizing a key derivation module that resides and/or executes wholly within a platform layer of the execution environment. An application executing within an application layer of the execution environment may access the key derivation module in order to generate (e.g., derive) a cryptographic key according to a (possibly standardized) key derivation function. The derived key may not be returned to the application, but may instead be stored within a secure storage area of the execution environment without being stored, even temporarily, in non-secure areas of the execution environment. The application may receive a reference to the derived key usable by other cryptographic processes.

A card computing device may host a virtualized execution environment that includes multiple standardized key derivation functions and may provide an API allowing applications execution on the card computing device to utilize the key derivation functions for securely generating and storing cryptographic keys. The execution environment may allow the sharing of key derivation functions among various applications.

An application may pass a key reference, such obtained via a key derivation function, to a method of a cryptographic module and the key reference may be used by the cryptographic module to access the derived key from a secure storage area for use in performing any of various cryptographic processes (e.g., encryption, decryption, authentication, etc.).

While various embodiments are described herein by way of example for several embodiments and illustrative drawings, those skilled in the art will recognize that embodiments are not limited to the embodiments or drawings described. It should be understood that the drawings and detailed description thereto are not intended to limit the embodiments to the particular form disclosed, but on the contrary, the intention is to cover all modifications, equivalents and alternatives falling within the spirit and scope of the disclosure. Any headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Figure 1:
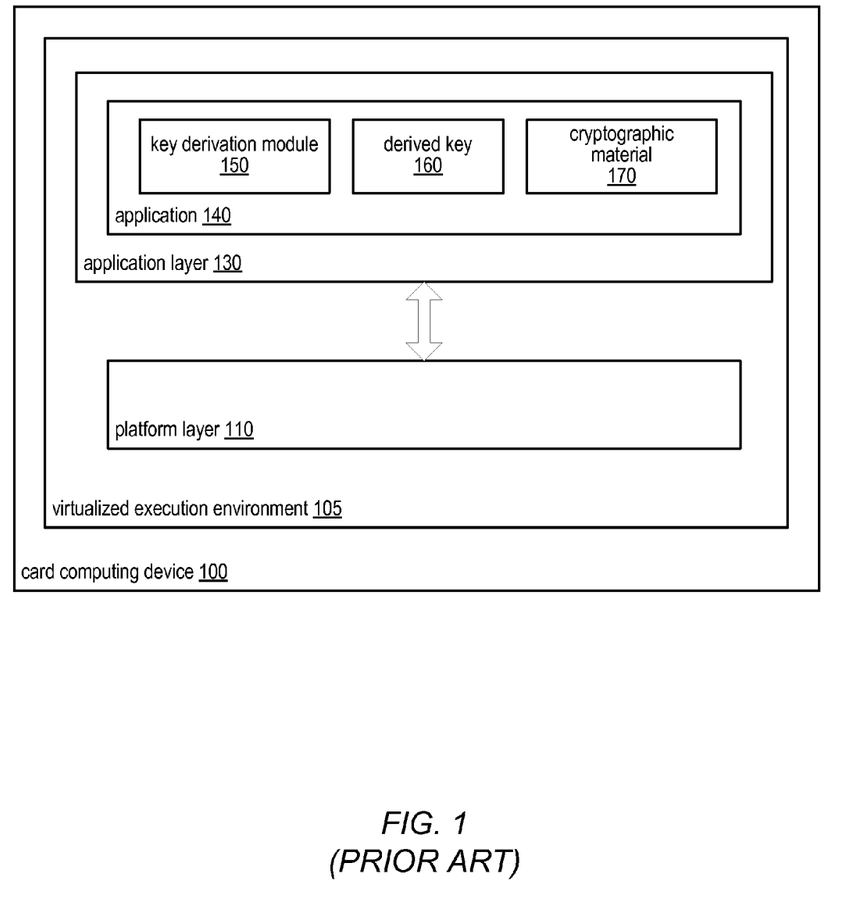
FIG. 1 is a logical block diagram illustrating a system configured to implement a key derivation function according to the prior art.

FIG. 1 is a logical block diagram illustrating a system configured to implement a key derivation function according to the prior art. As illustrated in FIG. 1, a card computing device 100 may be configured to host a virtualized execution environment 105 that includes a platform layer 110 and an application layer 130. In some embodiments, virtualized execution environment 105 may be configured to host execution of one or more applications at the application layer 130 while providing device-level functionality at the platform layer 110 to support the execution of applications. For example, the virtualized execution environment may provide an Application Programming Interface (API) allowing applications to access device-level (and/or system-level) functionality. Additionally, a virtualized execution environment may provide functionality at the platform layer for managing (e.g., loading, installing, and/or removing) applications. An application 140 may be configured to determine and use one or more cryptographic keys, such as derived key 160, based on cryptographic material 170. Application 140 may include key derivation module 150 and use key derivation module 150 to generate derived key 160 using cryptographic material 170.

As shown in FIG. 1, according to the prior art, an application 140 executing on a card computing device 100, executes key derivation module 150 in the application layer 130, resulting in derived key 160 also being in the application layer 130. Traditionally, derived key 160, cryptographic material 170, as well as other intermediate data used as part of generating derived key 160 would necessarily be present in the normal memory (e.g., RAM) used by the application layer 130 of card computing device 100.

Traditionally, when key derivation functions are implemented within a platform independent object oriented language within a secure environment (i.e. Java Card or Oracle Java for TEE), the key derivations functions are performed by the application at the application level (e.g., within an application layer). For example, the platform layer and/or specifications may not provide support for key derivation functions. However, implementing such sensitive functions at the application level may expose the data created and the initial long live key (e.g., master key) to unnecessary risk because the key data (and especially the derived cryptographic keys) are not kept in secure parts of the chip. They will be held at least for a short time in the (less secure) RAM of the chip which may expose them (and the cryptographic process) to any of various cryptographic attacks.

Figure 2:
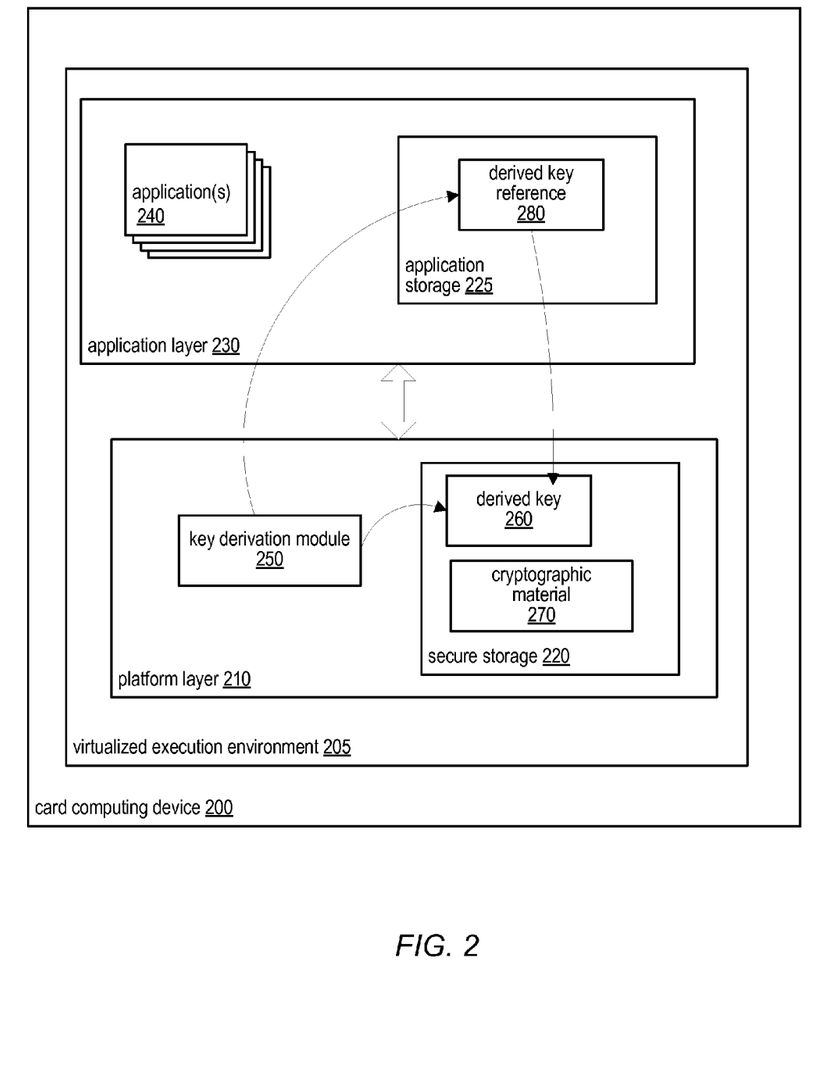
FIG. 2 is a logical block diagram illustrating a system configured to implement a secure key derivation function according to one embodiment as described herein.

FIG. 2 is a logical block diagram illustrating a system configured to implement a secure key derivation function according to one embodiment as described herein. As shown in FIG. 2, a card computing device 200 may be configured to implement a secure key derivation function, as described herein.

As referred to herein, a card computing device may refer to any of various types of pocket-sized cards with embedded integrated circuits, including, but not limited to a smart card, a chip card, an integrated circuit card (ICC), an embedded secure chip, a smart secure digital (SD) card (e.g., a smart microSD card), or a universal integrated circuit cards (UICC). A card computing device may be configured for use in various roles in any of various systems, such as to provide identification, authentication, data storage and/or application processing. Card computing devices may also provide strong security authentication for single sign-on (SSO) within large organizations.

In various embodiments, card computing devices may include (but not be limited to) credit cards, automated teller machine (ATM) cards, mobile phone subscriber identity module (SIM) cards, drivers licenses, authorization cards for pay television, pre-payment cards, high-security identification cards, access control cards and telephone call payment cards. In additional a card computing device may be configured for use as an electronic wallet, such as by recording and managing one or more financial accounts. While described mainly in terms of removable card computing devices, the methods and/or techniques described herein also apply to embedded card computing devices, such as embedded SIM cards, embedded universal integrated circuit card (eUICC), trusted platform module (TPM), or other embedded secure chips.

A card computing device 200 may be configured to store and execute one or more applications, such as application(s) 240, via an operating system or runtime environment, such virtualized execution environment 205. For example, in one embodiment, a card computing device may be configured to store and execute a Java based runtime environment and Java applets, such as according to the Java Card™ specifications. As used herein, Java Card™ may refer to technology that allows Java-based applications (e.g., applets) to be executed on a card computing device. In some embodiments, a Java Card™ based card computing device may include a combination of a virtual machine (e.g., Java Card™ Virtual Machine or Java Card™ VM) and a runtime library as well as one or more applets. In some embodiments, a card computing device may be configured to execute a Java Card™ Runtime Environment (JCRE) with one or more modules capable of performing secure key derivation functions, such as within platform layer 210. In some embodiments, virtualized execution environment 205 and/or platform layer 210 may represent a Java Card™ Virtual Machine implementation executing on a card computing device.

Additionally, in some embodiments, a card computing device may be configured to utilize a secure, protected processing environment, such as a trusted execution environment (TEE). As one example, a mobile phone may include a processor that implements a TEE and a card computing device (e.g., SIM card) incorporated into the phone may be configured to utilize the TEE of the processor.

As shown in FIG. 2, card computing device 200 may be configured to implement a secure key derivation function, such as key derivation module 250, in the platform layer 210. For instance, as described below, virtualized execution environment may provide functionality at the platform layer to support key derivation functions, according to some embodiments. An application, executing in the application layer 230 may access and utilize key derivation module 250 in order to generate a derived key 260, such as by utilizing cryptographic material 270, according to some embodiments. In some embodiments, virtualized execution environment 205 may be configured to host execution of one or more applications at the application layer 230 while providing device-level functionality at the platform layer 210 to support the execution of applications. As shown in FIG. 2, key derivation module 250 may be configured to generate derived key 260 utilizing secure storage 220, which may represent any of various types of cryptographically secure memory areas and/or execution modes of the virtualized execution environment 205 and/or of card computing device 200 available to platform layer 210.

In some embodiments, secure storage 220 may represent any of various forms of storage capable of ensuring the confidentiality, integrity, availability and durability of data (e.g., at least for the duration of an execution). In some embodiments, secure storage 220 may be separated by hardware from the main operating system, and may ensure the secure storage and processing of sensitive data.

Thus, in some embodiments, a key derivation module 250 may generate a derived key 260 without exposing the derived key to the application layer.

In some embodiments, the output data of deriving a key may never be exposed to the application (e.g., applet) layer. An application may only get a reference object as a return value of the key derivation method. Thus, the process of feeding data into the cipher and storing the output for the derived key in a secure part of memory may be better optimized and protected, according to one embodiment.

A key derivation function (KDF) may be considered, in some embodiments, a one way function that provides cryptographic separation of key material. For example, a KDF may use a long lived cryptographic key (e.g., a master key) along with key derivation data from which a new key, such as derived key 260, is derived. This new key may be used for a short time and/or only for a specific purpose. The long lived key, which may be an input to the KDF, may not be used for any other purpose than for deriving new keys.

Additionally, key derivation module 250 may be configured to ensure that the derived key 260, as well as cryptographic material 270, resides in the secure storage 220. According to some embodiments, key derivation module 250, derived key 260, as well as cryptographic material 270, may never be present in the, generally less secure, application storage 225 of the application layer 230. Thus, in some embodiments, key derivation module 250, derived key 260, as well as cryptographic material 270, may not be available for inspection and/or analysis, such as for a cryptographic attack.

An application 240 may be configured to initiate the generation of derived key 260, via key derivation module 250. Key derivation module 250 may return a derived key reference 280, such as a key object, that application 240 may use to reference derived key 260, as will be discussed in more detail below. Derived key reference 280 may be returned to application 240 and stored in application storage 225 in application layer 230. According to some embodiments, derived key reference 280 may not include any cryptographically sensitive material or data, but instead, may be a programmatic object or reference that allows other programmatic modules, such as may be executed within platform layer 210, to access derived key 260 from secure storage 220.

Thus, according to some embodiments, the derived key data, such as derived key 260, may stay within a secure part of the runtime environment (e.g., virtualized execution environment 205). A key object, such as derived key reference 280 may be created that can subsequently be used in cryptographic operations. Furthermore, in some embodiments, there may be no need to copy (secure or cryptographic) data out of the derivation function into a key object via memory in the application layer.

In some embodiments, key derivation functions, such as implemented by key derivation module 250, may be implemented in hardware, which may provide performance and/or security benefits over a software only approach. Additionally, in some embodiments, platform layer 210 may be (or may be part of) a certified platform and therefore the key derivation functions may be also part of a certified platform.

Various standardized key derivation functions have been defined (or recommended) by various industries and/or organizations, such as the financial industry, the National Institute of Standards and Technology (NIST), the Internet Engineering Task Force (IETF), European Telecommunications Standards Institute, $3^{rd}$ Generation Partnership Project, the trusted platform module (TMP) specification by the Trusted Computing Group, etc. In some embodiments, a standardized KDF may be implemented in a secure chip or the hardened OS of the secure environment, such as within the hardware of card computing device 200 or within secure portions of virtualized execution environment 205.

The output data of a KDF, such as derived key 260, may be directly managed in this secure area and thus the content of the key may not be exposed to the (less secure) RAM of the chip or to the general memory of the environment (e.g., that is accessible via the application layer 230), according to some embodiments. In other words, they derived key may be created and initialized within a secure part of the execution environment (e.g., within the chip or secure areas of the platform layer).

Additionally, having the key derivation function implemented within secure areas of the platform may prevent an application using an incorrect KDF implementation and leaving the content of the derived key (or part of it) in shared buffers or other parts of memory that are not secure (to the same degree as the secure areas of the platform).

In some embodiments, having key derivation functions implemented at the platform layer may also reduce the size of individual applications (or applets) and of the overall size required for applications in the application layer. For instance, the key derivation functions may be shared among the applications and each application may not have to implement the same key derivation function as another application. In some embodiments, the key derivations functions may be implemented as a shareable service by a security domain of the card computing device and a key derivation function and a master key may therefore be shared among several applications.

Figure 3:
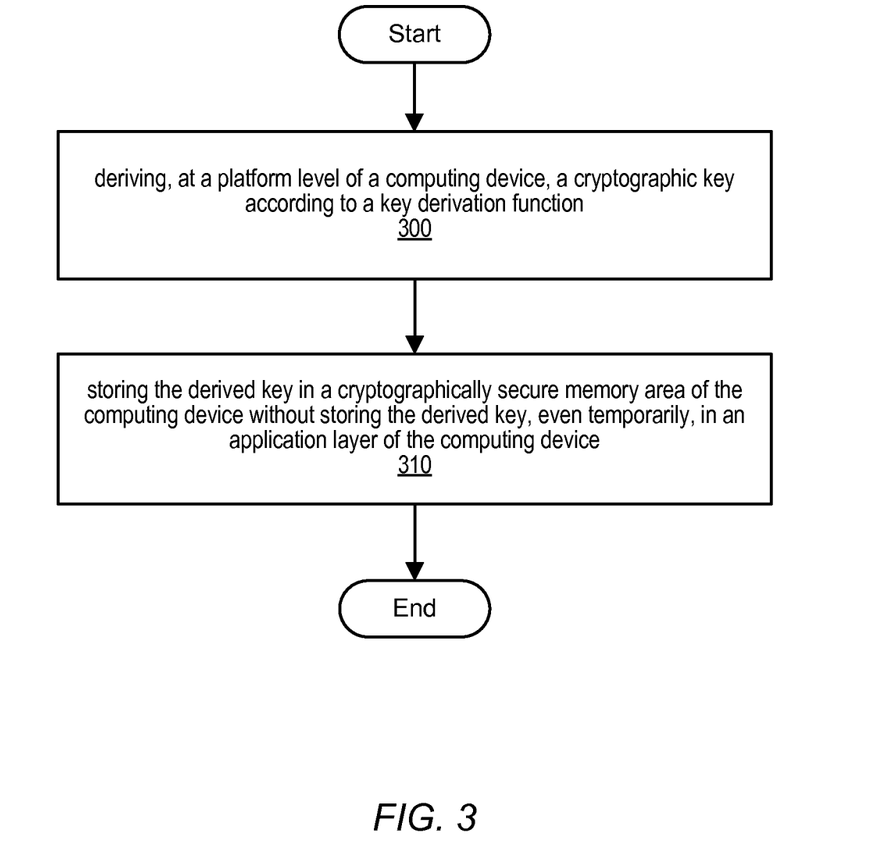
FIG. 3 is a flowchart illustrating one embodiment of a method for secure key derivation, as described herein.

FIG. 3 is a flowchart illustrating one embodiment of a method for secure key derivation, as described herein. As shown in block 300, a method for implementing secure key derivation may include deriving, at a platform layer of a computing device, a cryptographic key according to a key derivation function, according to one embodiment. For example, key derivation module 250 may execute within the platform layer 210 of card computing device 200. Key derivation module 250 may derive derived key 260 within the platform layer 210.

As used herein the term "key derivation function" may refer to either a particular method (i.e., formula) for generating a cryptographic key or to a computing module (implemented in SW and/or HW) that generates a cryptographic key according to such a method, or both. Thus, key derivation module 250 may represent a software module that, when executed within platform layer 210 on card computing device 200, may generate a derived key 260 according to a particular key derivation function (e.g., a particular method for deriving a cryptographic key).

As shown in block 310, a method for implementing secure key derivation may also include storing the derived key in a cryptographically secure memory area of the computing device without storing the derived key, even temporarily, in an application layer of the computer device, according to one embodiment. For example, key derivation module 250 may store derived key 260 in secure storage 220 of card computing device 205 without storing derived key 260, even temporarily any less secure storage area, such as application storage 225, of the application layer 230.

Figure 4:
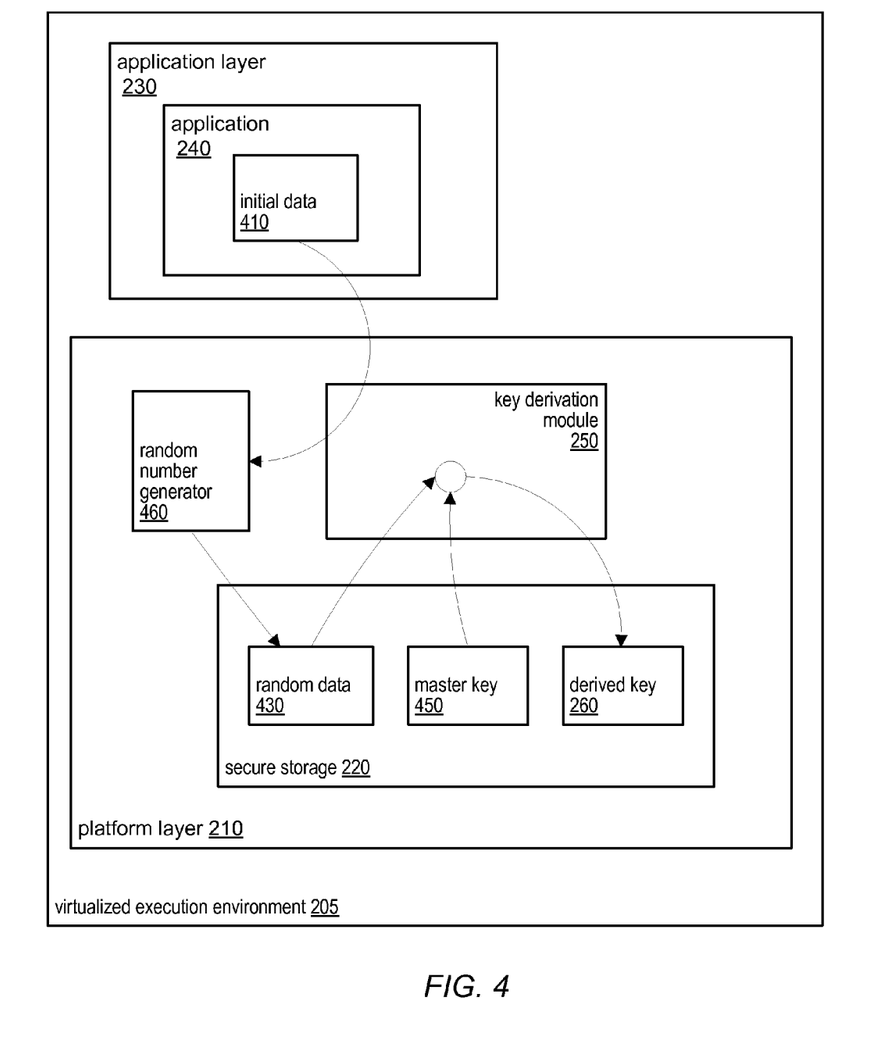
FIG. 4 is a logical block diagram illustrating the derivation of a cryptographic key according to one embodiment.

FIG. 4 is a logical block diagram illustrating the derivation of a cryptographic key according to one embodiment. In some embodiments, an application, such as application 240, may be configured to provide data, such as initial data 410, to a key derivation module, such as key derivation module 250, for use in generating a cryptographic key, such as derived key 260. For example, in one embodiment, initial data 410 may represent data used, at least partially, to initialize a random number generator, such as random number generator 460, to be used by key derivation module 250. Thus, application 240 may provide initial data 410 to key derivation module 250 which in turn may provide it to random number generator 460 to generate random data 430 to be used during generation of derived key 260.

Even though initial data 410 may reside, at least temporarily, in application layer 230 and therefore may not be secure from cryptographic attacks, according to some embodiments, random number generator 460, as well as random data 430, may be part of platform layer 210 and may reside in, or take advantage of, cryptographically secure features, such as secure storage 220, of platform layer 210 and/or of the card computing device.

In some embodiments, the key derivation function may be integrated into (or implemented in) the chip hardware and the low level software layers of the chip operating system. For example, key derivation module 250 may be configured to utilize key derivation functionality implemented as part of (or integrated into) the hardware of card computer device 200, according to some embodiments.

As illustrated in FIG. 4, key derivation module 250 may be configured to generate derived key 260, based on random data 430 and/or master key 450, all which may be stored in secure storage 220, according to one embodiment. Thus, in some embodiments, some (or all) of the data used in generating a cryptographic key may remain in platform layer 210 and may therefore be stored in, or take advantage of, secure features provided by platform layer 210 and/or card computing device 200.

In some embodiments, a master key, such as master key 450, as well as other cryptographic material, such as random data 430 and/or cryptographic material 270 may be loaded into secure storage 220 during a production process of the card computing device (e.g., when the device is loaded with software) and therefore are never stored, even temporarily, within non-secure areas of virtualized execution environment 205. In other embodiments, master key 450, random data 430 and/or cryptographic material 270 may be stored in secure storage 220 in other manners or at other times.

In some embodiments, derived key 260 may be derived from master key 450 by retrieving random data 430 from random number generator 460, initializing a cryptographic cipher with the master key and may performing a cryptographic cipher operation on the derivation data. In some embodiments, the derivation data may be formed from the random data along with some other additional data. Thus, by implementing the random number generator and the key derivation functions within (secure areas of) the platform layer, the random data and any additional derivation data do not have to be copied using memory in the application layer.

For example, in one embodiment secure storage 220 may represent a security domain (SD) of the card computing device and master key 450 may be stored within this SD. Additionally, the SD may provide a shared interface to other applications executing on the device. Thus, according to some embodiments, master key 450 may remain within the SD while being shared among multiple applications.

It should be noted that the particular embodiment illustrated in FIG. 4 represents only one possible example, and that in other embodiments, a key derivation module may generate a cryptographic key using different data, techniques and methods.

Figure 5:
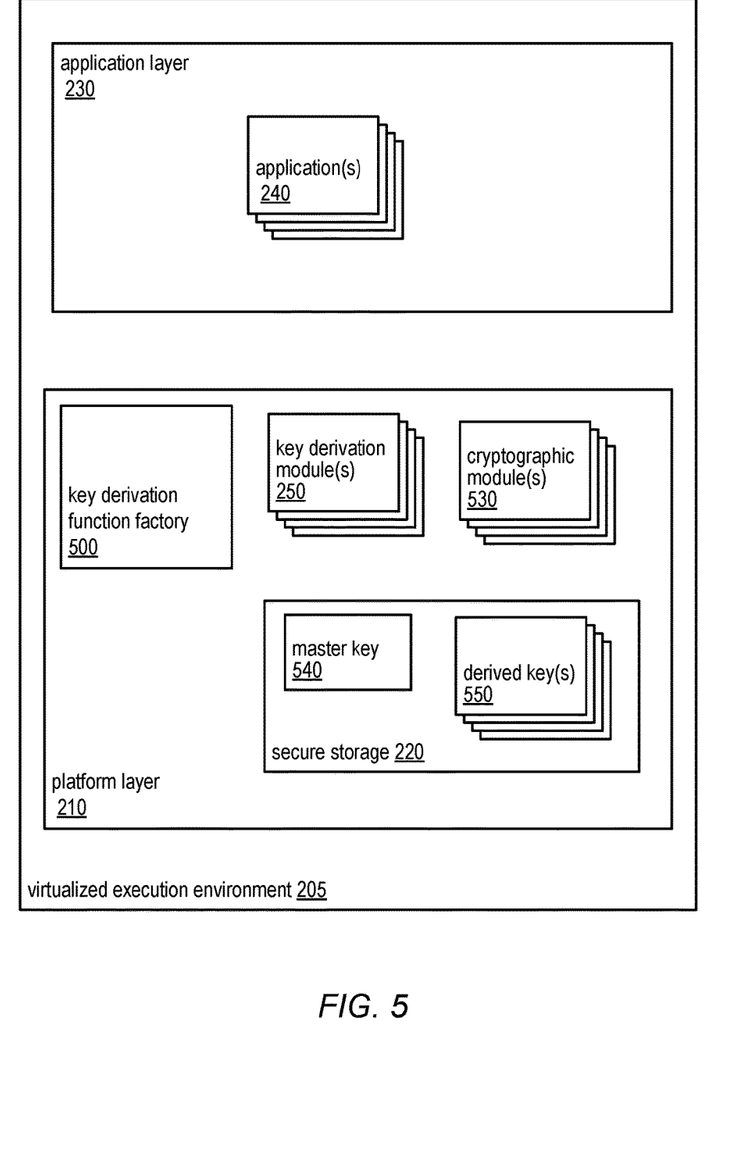
FIG. 5 is a logical block diagram illustrating a virtual execution environment configured to implement a secure key derivation function.

FIG. 5 is a logical block diagram illustrating a virtual execution environment configured to implement a secure key derivation function. In some embodiments, a card computing device may include multiple key derivation modules as well as multiple cryptographic modules usable by application executing on the card computing device. Thus, card computing device 200 may include platform layer 210 executing within virtualized execution environment 205. Platform layer 210 may include one or more key derivation module(s) 250 which may be configured to generate (e.g., derive) cryptographic keys, such as derived key(s) 550, according to various key derivation functions or methods. In some embodiments, applications executing on the card computing device may be configured to access one or more of the key derivation module(s) 250 directly, such as to cause the generation of a cryptographic key.

In other embodiments, however, platform layer 210 may be configured to implement key derivation function factory 500 that, in turn, may be configured to generate, and/or provide access to, a particular key derivation module at the request of an application. For example, key derivation function factory 500 may include and expose one or more factory API methods accessible to applications within the application layer of the card computing device. An application may access key derivation function factory 500 via one or more factory API methods to request a particular key derivation module 250. Key derivation function factory 500 may, in response, generate a programmatic object configured to provide access to the particular key derivation module. For instance, in one embodiment, key derivation function factory 500 may be configured to generate and return key derivation function objects that include one or more method calls for accessing and executing a key derivation module.

The key derivation module(s) 250 may be configured to generate (e.g., derived) cryptographic keys, such as derived key(s) 550, which in turn may be usable my one or more cryptographic module(s) 530. In some embodiments, key derivation module(s) 250 may be configured to generate more than one derived key based on a single master key, such as master key 540. Thus, by utilizing a secure key derivation function, a platform layer of a runtime environment, such as platform layer 210 of virtualized execution environment 205, may protect a standardized KDF in the runtime environment and may be configured to share the KDF and the master key among several applications, such as application(s) 240.

In other embodiments, however, key derivation module(s) 250 may not generate multiple keys based on a single master key. In general, any of various techniques for generating or deriving cryptographic keys may be utilized, according to different embodiments.

In some embodiments, cryptographic module(s) 530 may represent any of various methods and/or functions that utilize (or require) cryptographic keys, such as encryption, decryption, authentication, etc.

Figure 6:
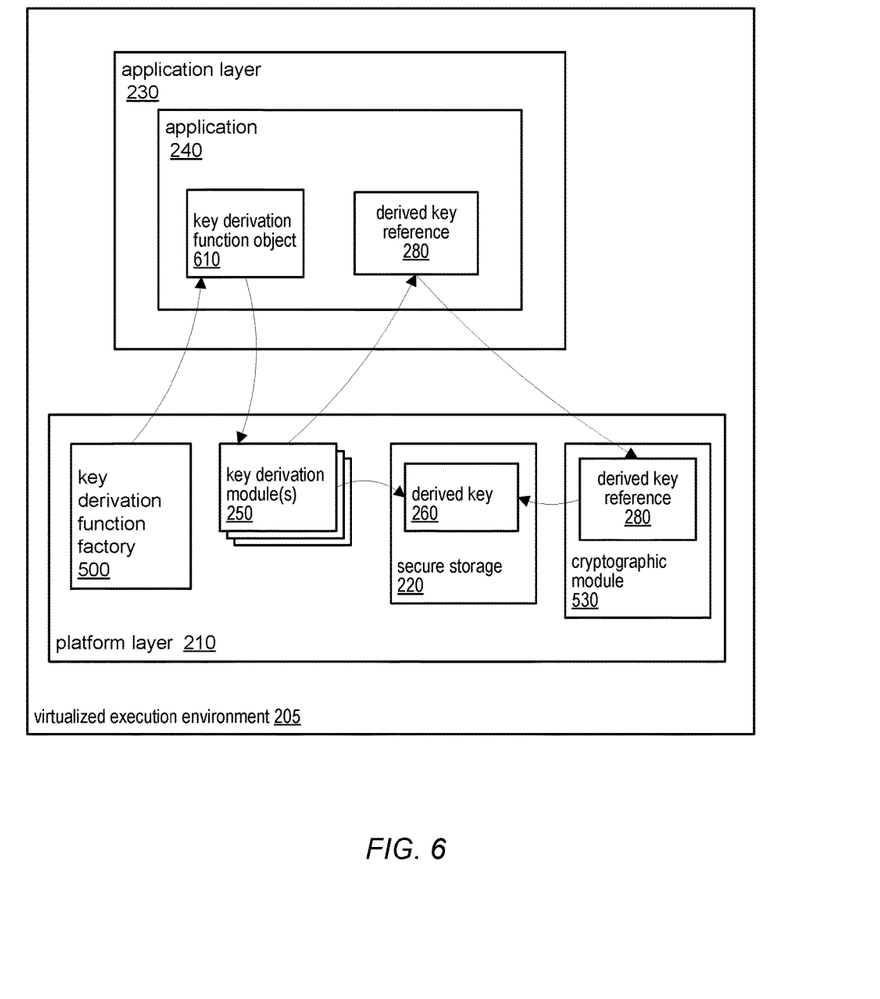
FIG. 6 is a logical block diagram illustrating an application utilizing a cryptographic function with a derived cryptographic key, according to one embodiment.

FIG. 6 is a logical block diagram illustrating an application utilizing a cryptographic function with a derived cryptographic key, according to one embodiment. As illustrated in FIG. 6, an application, such as application 240, executing within an application layer 230 of a virtualized execution environment 205, may obtain a key derivation function object 610 from a key derivation function factory 500.

For example, application 240 may call a method of key derivation function factory 500 and may specify (or identify) a particular key derivation function. In response, key derivation function factory 500 may create key derivation function object 610 and configure it to provide access to the particular key derivation function (such as by being able to call method of a corresponding key derivation module).

Application 240 may then use key derivationfunction object 610 to access a key derivation module 250 in order to generate derived key 260. For example, in one embodiment, methods of key derivation function factory 500 may return instances of a key derivation function object 610 and key derivation function object 610 may provide access to one specific key derivation function, via a key derivation module 250. Additionally, an application may be able to reuse a key derivation function object 610 in order to access a different key derivation function via a different key derivation module, such as by calling another of method of key derivation function factory 500, according to some embodiments.

Key derivation module 250 may return a key reference, such as derived key reference 280 to application 240. In some embodiments, derived key reference 280 may represent a programming object, such as in an object oriented programming language implementation. In other embodiments, derived key reference 280 may represent another method of referencing data within platform layer 210.

Application 240 may then pass derived key reference 280 to cryptographic module 530 so that cryptographic module 530 may access derived key 260 in secure storage 220 via derived key reference 280. Thus, in some embodiments, cryptographic module 530 may access derived key 260 via derived key reference 280, such as to perform one or more cryptographic functions (e.g., encryption, decryption, authentication, etc.) using derived key 260.

As shown in FIG. 6, only reference to cryptographic objects, such as key derivation function object 610 and derived key reference 280 may reside in application layer 230. In some embodiments, key derivation function factory 500, key derivation module(s) 250, derived key 260, and cryptographic module(s) 530 may reside and/or execute within platform layer 210. Thus, the sensitive cryptographic information, such as the particulars of a key derivation function, the derived key, and the details of a cryptographic module, as well as other cryptographically sensitive material may be within, under, or able to take advantage of, one or more security features of the platform layer and/or the card computing device, according to various embodiments.

In other words, it may be harder for an attacker to locate, obtain and/or analyze the cryptographic functions and/or data that is within (or that is executing within) platform layer 210, than if those same functions and/or data were within application layer 230. For instance, cryptographic data, such as derived key 260 may be stored within secure storage 220, which may represent an area of memory that is more secure (e.g., against cryptographic attacks) than the memory area(s) allocated to, and/or used by, application layer 230.

Figure 7:
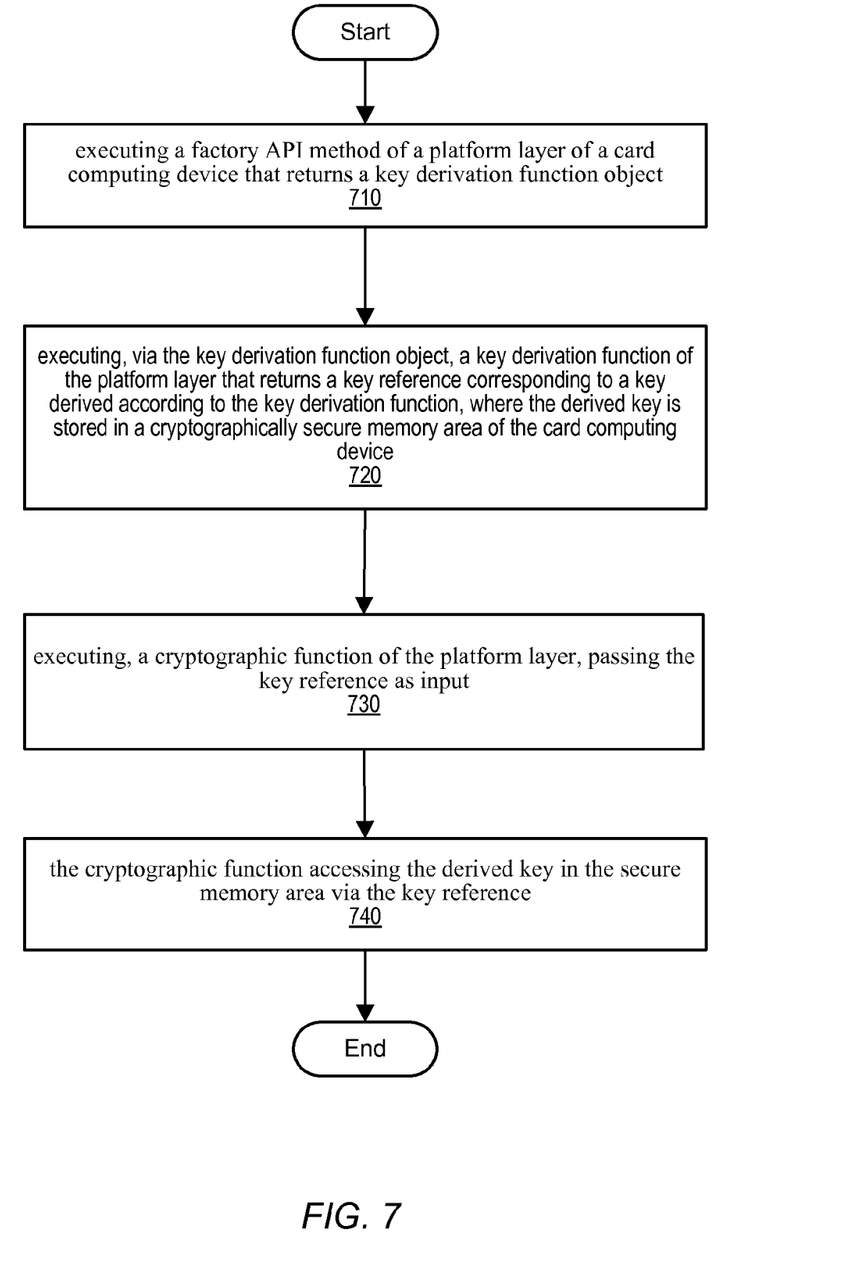
FIG. 7 is a flowchart illustrating one embodiment of a method for using a derived cryptographic key via a key reference, according to one embodiment.

FIG. 7 is a flowchart illustrating one embodiment of a method for using a derived cryptographic key via a key reference, according to one embodiment. As shown in block 710, an application may execute a factory API method, such as may be provided by derivation function factory 500, of a platform layer of a card computing device that returns a key derivation function object, according to one embodiment. Additionally, as shown in block 720, the application may execute, via the key derivation function object, a key derivation function of the platform layer that returns a key reference corresponding to a key derived according to the key derivation function. For instance, as described above, derivation function factory 500 may return a key derivation function object 610, usable to access one or more methods of a key derivation module 250.

The derived key may be stored in a cryptographically secure memory area of the card computing device, as in block 720. For instance, in one embodiment derived key 260 may be stored by key derivation module 250 in secure storage 220. As shown in block 730, a cryptographic function of the platform layer may be executed, passing the key reference as input. For example, application 240 may execute one or more methods of a cryptographic module 530 and may pass derived key reference 280 as an input to the executed method(s). Furthermore, as shown in block 740, the cryptographic function may access the derived key in the secure memory area via the key reference, according to some embodiments. For example, one or more methods of cryptographic module 530 may be configured to perform one or more cryptographic functions (e.g., encryption, decryption, authentication, etc.) using a cryptographic key. Thus, cryptographic module 530 may access derived key 260 in secure storage 220 via derived key reference 280.

Figure 8:
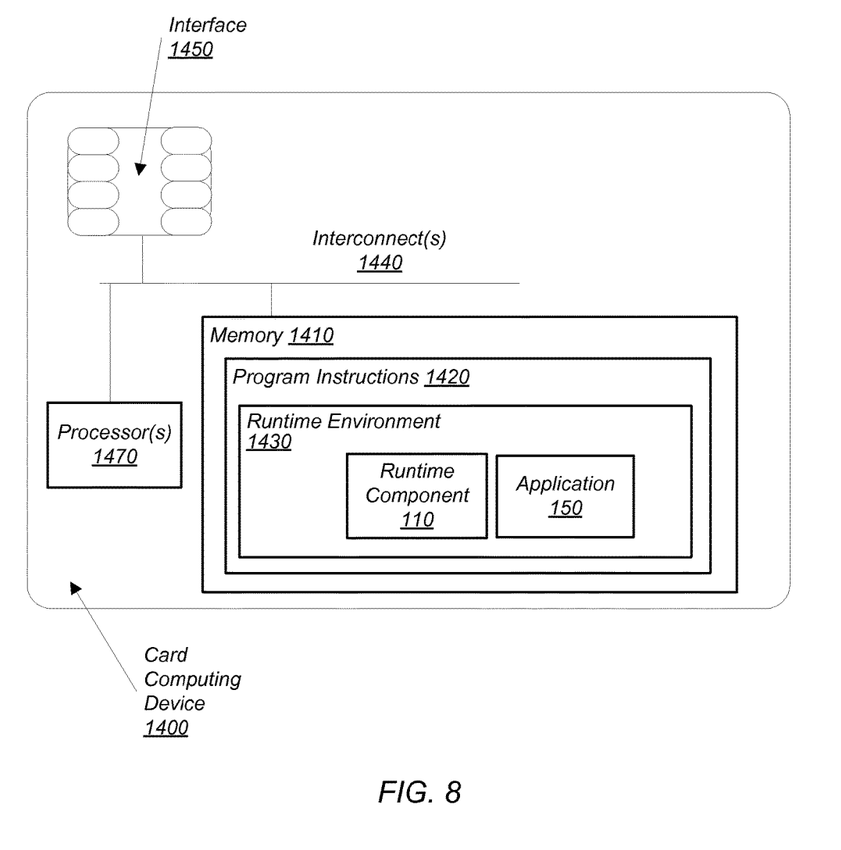
FIG. 8 is a block diagram illustrating one embodiment of a card computing device configured to implement a secure key derivation module, as described herein.

The techniques described herein for secure key derivation may be implemented in any of a wide variety of computing systems. FIG. 8 illustrates a card computing device configured to implement secure key derivation, as described herein and according to various embodiments.

In some embodiments, card computing device 1400 may be any of various types of pocket-sized cards with embedded integrated circuits, including, but not limited to a smart card, a chip card, an integrated circuit card (ICC), or a universal integrated circuit cards (UICC), credit card, automated teller machine (ATM) card, mobile phone subscriber identity module (SIM) card, authorization card for pay television, pre-payment card, high-security identification card, access control card and telephone call payment card. Card computing device 1400 may be configured for use in various roles in any of various systems, such as to provide identification, authentication, data storage and/or application processing.

As described herein, card computing device 1400 may be configured to communicate with external devices and services via any of various card-reading devices and/or interfaces. For example, in some embodiments, card computing device 1400 may include one or more terminal interfaces 1450. In some embodiments, terminal interface 1450 may be a communications medium between the card computing device and a host or terminal for the card computing device. Terminal interface 1450 may be configured to communicate according to any of various protocols, including but not limited to Single Wire Protocol (SWP) and Host Controller Interface (HCI) specifications.

In some embodiments, terminal interface 1450 may include a contact area comprising several electrically conductive contact pads which may provide electrical connectivity when inserted into a terminal, host or other card reader. In other embodiments, terminal interface 1450 may comprise a contactless communication device configured to communicate with a terminal via radio waves.

While described herein mainly in reference to smaller, (e.g., pocket-sized) integrated circuit cards, the methods and techniques described herein may also be performed on other computing devices. Thus, in some embodiments, card computing device 1400 may be any of various types of devices, including, but not limited to, a mobile phone, a personal computer system, desktop computer, laptop or notebook computer, mainframe computer system, handheld computer, workstation, network computer, a consumer device, application server, storage device, a peripheral device such as a switch, modem, router, etc, or in general any type of computing device.

In some embodiments, the methods described herein may be implemented by a computer program product, or software, that may include a non-transitory, computer-readable storage medium having stored thereon instructions, which may be used to program a computer system (or other electronic devices) to perform some or all of the techniques described herein. A computer-readable storage medium may include any mechanism for storing information in a form (e.g., software, processing application) readable by a machine (e.g., a computer). The machine-readable medium may include, but is not limited to, magnetic storage medium (e.g., hard disk drive or floppy diskette); optical storage medium (e.g., CD-ROM); magneto-optical storage medium; read only memory (ROM); random access memory (RAM); erasable programmable memory (e.g., EPROM and EEPROM); flash memory; electrical, or other types of medium suitable for storing program instructions. In addition, program instructions may be communicated using optical, acoustical or other form of propagated signal (e.g., carrier waves, infrared signals, digital signals, etc.).

A card computing device 1400 may include a processor unit 1470 (possibly including an integrated circuit, a self-programmable one-chip microcomputer (SPOM), multiple processors, a single-threaded processor, a multi-threaded processor, a multi-core processor, etc.) which may be configured to execute a runtime environment, such as runtime environment 1430 including one or more components or applications, such as virtualized execution environment 205, platform layer 210, and key derivation module 250, which may be present within program instructions 1420 stored in memory 1410 of the same card computing device 1400 on which runtime environment 1430 is executed or may be present within program instructions stored within a memory of another computer system similar to or different from card computing device 1400.

The card computing device 1400 may include one or more system memories 1410 (e.g., one or more of cache, SRAM DRAM, RDRAM, EDO RAM, DDR RAM, SDRAM, Rambus RAM, EEPROM, etc.) which may be mutable or immutable, a system interconnect 1440 (e.g., LDT, PCI, ISA, etc.), and a terminal interface 1450 (e.g., an ATM interface, an Ethernet interface, a Frame Relay interface, etc. The memory medium may include other types of memory as well, or combinations thereof. In other embodiments, card computing device 1400 may include more, fewer, or different components than those illustrated in FIG. 8. The processor(s) 1470, the terminal interface 1450 and the system memory 1410 may be coupled to the system interconnect 1440.

One or more of the system memories 1410 may include program instructions 1420 configured to implement some or all of the techniques described herein for establishing and managing secure channel communications (according to any of the embodiments described herein). For example, one or more of the system memories 1410 may include code to implement and/or execute runtime environment 1430, virtualized execution environment 205, platform layer 210, and key derivation module 250, according to one embodiment.

In various embodiments, program instructions 1420, runtime environment 1430, virtualized execution environment 205, platform layer 210, and key derivation module 250, and/or individual sub-modules of these components may each be implemented in any of various programming languages or methods. For example, in one embodiment, virtualized execution environment 205, platform layer 210, and key derivation module 250 may be JAVA based, while in another embodiment, they may be written using the C or C++ programming languages. Similarly, runtime environment 1430 may be written using Java, C, C++, or another programming language, according to various embodiments. Moreover, in some embodiments, runtime environment 1430, virtualized execution environment 205, platform layer 210, and key derivation module 250, and various sub-modules of these components may not be implemented using the same programming language.

While various systems and methods have been described herein with reference to, and in the context of, specific embodiments, it will be understood that these embodiments are illustrative and that the scope of the disclosure is not limited to these specific embodiments. Many variations, modifications, additions, and improvements are possible. For example, the blocks and logic units identified in the description are for understanding the described embodiments and not meant to limit the disclosure. Functionality may be separated or combined in blocks differently in various realizations of the systems and methods described herein or described with different terminology.

These embodiments are meant to be illustrative and not limiting. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the exemplary configurations may be implemented as a combined structure or component. These and other variations, modifications, additions, and improvements may fall within the scope of the disclosure as defined in the claims that follow.

Although the embodiments above have been described in detail, numerous variations and modifications will become apparent once the above disclosure is fully appreciated. It is intended that the following claims be interpreted to embrace all such variations and modifications.

What is claimed is:

1. A method, comprising:
    performing, by a computing device:
        deriving, at a platform layer of a virtualized execution environment, a cryptographic key, according to one of a plurality of key derivation functions comprising formulas according to which cryptographic keys may be derived; wherein the virtualized execution environment comprises the plurality of key derivation functions, an application layer and the platform layer;
        wherein the virtualized execution environment is configured to host execution of applications written in a platform independent object oriented language at the application layer, and to provide device-level functionality at the platform layer to support the execution of the applications;
        storing the derived key in a cryptographically secure memory area of the virtualized execution environment without storing, even temporarily, any portion of the derived key in non-secure memory at the application layer, wherein the secure memory area is not directly accessible from the application layer;
        generating, at the platform layer of the virtualized execution environment, a key reference to the derived key, wherein the key reference is a programming object in the platform independent object oriented language, wherein the derived key is accessible from the cryptographically secure memory area of the virtualized execution environment via the key reference; and
        accessing the stored derived key via the key reference.

2. The method of claim 1, further comprising:
    executing, from the application layer, a key derivation API method of the platform layer configured to perform said deriving, said storing and said generating, wherein the key derivation API method is further configured to return the key reference to the derived key.

3. The method of claim 2, wherein the platform layer comprises one or more cryptographic methods configured to be initiated from the application layer and to utilize the derived key via the key reference, the method further comprising:
    executing one of the cryptographic methods passing the key reference as input.

4. The method of claim 2, further comprising executing, from the application layer, a factory API method of the platform layer, wherein the factory API method is configured to:
generate a key derivation function object configured to perform said executing the key derivation API method of the platform layer.

5. The method of claim 1, wherein the cryptographic key is based, at least in part, on a master key stored in the secure memory area of the virtualized execution environment.

6. The method of claim 5, further comprising deploying the master key to the secure memory area during a production process for the virtualized execution environment.

7. The method of claim 1, wherein the key derivation API of the platform layer comprising a plurality of key derivation methods, wherein each key derivation method is configured to derive a respective cryptographic key according a respective key derivation function.

8. A non-transitory, computer-readable storage medium storing program instructions that when executed on a card computing device cause the card computing device to perform:
deriving, at a platform layer of a virtualized execution environment, a cryptographic key, according to one of a plurality of key derivation functions comprising formulas according to which cryptographic keys may be derived, wherein the virtualized execution environment comprises the plurality of key derivation functions, an application layer and the platform layer;
wherein the virtualized execution environment is configured to host execution of applications written in a platform independent object oriented language at the application layer, and to provide device-level functionality at the platform layer to support the execution of the applications;
storing the derived key in a cryptographically secure memory area of the virtualized execution environment without storing, even temporarily, any portion of the derived key in non-secure memory at the application layer, wherein the secure memory area is not directly accessible from the application layer;
generating, at the platform layer of the virtualized execution environment, a key reference to the derived key, wherein the key reference is a programming object in the platform independent object oriented language, wherein the derived key is accessible from the cryptographically secure memory area of the virtualized execution environment via the key reference; and
accessing the stored derived key via the key reference.

9. The non-transitory, computer-readable storage medium of claim 8, wherein the program instructions further cause the card computing device to perform:
executing, from the application layer, a key derivation API method of the platform layer configured to perform said deriving, said storing and said generating, wherein the key derivation API method is further configured to return the key reference to the derived key.

10. The non-transitory, computer-readable storage medium of claim 9, wherein the platform layer comprises one or more cryptographic methods configured to be initiated from the application layer and to utilize the derived key via the key reference, wherein the program instructions further cause the card computing device to perform:
executing one of the cryptographic methods passing the key reference as input.

11. The non-transitory, computer-readable storage medium of claim 10, wherein the program instructions further cause the card computing device to perform:
executing, from the application layer, a factory API method of the platform layer, wherein the factory API method is configured to generate a key derivation function object that is configured to perform said executing the key derivation API method.

12. The non-transitory, computer-readable storage medium of claim 8, wherein the cryptographic key is based, at least in part, on a master key stored in the secure memory area of the virtualized execution environment.

13. The method of claim 1 non-transitory, computer-readable storage medium of claim 8, wherein the key derivation API of the platform layer comprises a plurality of key derivation methods, wherein each key derivation method is configured to derive a respective cryptographic key according a respective key derivation function.

14. A system, comprising:
a card computing device, comprising one or more processors and memory configured to implement a virtualized execution environment comprising a platform layer and an application layer, wherein the virtualized execution environment is configured to host execution of applications written in a platform independent object oriented language at the application layer, and to provide device-level functionality at the platform layer to support the execution of the applications;
wherein the platform layer implemented by the one or more processors and memory comprises: a key derivation module, one or more cryptographic modules and a cryptographically secure storage, wherein the cryptographically secure storage is not directly accessible from the application layer;
wherein the key derivation module is configured to:
derive a cryptographic key according to one of a plurality of key derivation functions comprising formulas according to which cryptographic keys may be derived;
store the derived key in the cryptographically secure storage, wherein the derived key is not stored, even temporarily, in the application layer;
generate a key reference to the derived key, wherein the key reference is a programming object in the platform independent object oriented language, wherein the derived key is accessible from the cryptographically secure storage via the key reference; and
wherein at least one of the cryptographic modules is configured to access the stored derived key via the key reference.

15. The system of claim 14, wherein the application layer implemented by the one or more processors and memory comprises an application, configured to:
execute, from the application layer, a key derivation API method of the platform layer configured to cause the key derivation module to derive the cryptographic key and store the derived key; and
return the key reference to the derived key to the application.

16. The system of claim 15, configured to utilize the derived key via the key reference, wherein the application is further configured to:
execute a method of one of the cryptographic modules; and
pass the key reference to the method as input.

17. The system of claim 15, wherein the one or more cryptographic modules, implemented by the one or more processors and memory, are each configured to utilize the derived key via the key reference, wherein the application is further configured to:
provide the key reference to another application of the card computing device;
wherein the other application is configured to:
execute a method of one of the cryptographic modules; and
pass the key reference to the method as input.

18. The system of claim 15, wherein the platform layer, implemented by the one or more processors and memory, further comprises a factory module configured to generate key derivation objects, each configured to execute a respective a key derivation API method of the platform layer, wherein the application is configured to:
request a particular key derivation object from the factory module; and
execute the key derivation API method of the platform layer via the particular key derivation object.

19. The system of claim 14, wherein the card computing device is one of: a Smart Card device, a SIMM device, embedded secure chip, trusted platform module, or a micro SD device.

20. The system of claim 14, wherein the virtualized execution environment comprises a Java-based trusted execution environment.

* * * * *

UNITED STATES PATENT AND TRADEMARK OFFICE
CERTIFICATE OF CORRECTION

PATENT NO. : 10,185,669 B2
APPLICATION NO. : 14/451309
DATED : January 22, 2019
INVENTOR(S) : Hans et al.

Page 1 of 1

It is certified that error appears in the above-identified patent and that said Letters Patent is hereby corrected as shown below:

In the Specification

In Column 8, Line 52, delete "derivationfunction" and insert -- derivation function --, therefor.

Signed and Sealed this
Seventh Day of January, 2020

Andrei Iancu
*Director of the United States Patent and Trademark Office*